Patented Jan. 5, 1943

2,307,455

UNITED STATES PATENT OFFICE 2,307,455

GUM INHIBITOR

Melville Ehrlich, Buffalo, N. Y., assignor to Allied Chemical & Dye Corporation, a corporation of New York No Drawing. Application August 30, 1939, Serial No. 292,626

4 Claims. (Cl. 44—73)

This invention relates to the use of condensation products of ketones with aminophenols to inhibit gum formation in hydrocarbon mixtures.

Petroleum distillates, particularly gasolines formed by cracking processes, tend to form insoluble bodies of a gummy or resinous character under normal storage conditions, due to autoxidation, polymerization and condensation of highly reactive constituents such as unsaturated hydrocarbons present in the hydrocarbon mixture. Gums thus formed in petroleum distillates give rise to a cloudy appearance and a disagreeable odor; in distillates intended for use as fuels in internal combustion engines, the gums tend to decrease the anti-knock rating of the fuel and form deposits in storage tanks, pipe lines, carburetors, valves, cylinders, and other parts of the engine.

Various substances, such as p-aminophenol, p-benzyl-aminophenol and other derivatives of aromatic amines, have heretofore been proposed as gum inhibitors, i. e. chemical agents to retard gum formation in gasoline. However, such inhibitors are subject to serious disadvantages as agents for inhibiting gum formation in gasoline, for example, (1) they are sufficiently soluble in water so that they are substantially lost when the gasoline containing them comes into contact with water, as it may do when the gasoline is placed in storage or in containers for transit; (2) they are insufficiently stable to retain their effectiveness throughout a normal period of storage; (3) they are insufficiently soluble in gasoline which is to be stabilized to permit use of the inhibitor in concentrations which are adequately effective; or (4) they may form combustion products which injure or corrode the interior of the engine.

It is, accordingly, an object of my invention to provide a new composition which is unusually effective as a gum inhibitor for petroleum distillates, said composition being sufficiently stable to provide adequate protection to petroleum distillates treated therewith against gum formation during normal periods of storage for which such treated distillates may be held, and sufficiently insoluble in water to afford substantially undiminished protection against the formation of gum in the said treated distillates even when the latter come into contact with water. It is a further object of my invention to provide a stable fuel which is highly efficient for internal combustion engines and which has little or no tendency to deposit gum during storage or use.

I have discovered the condensation product of a higher aliphatic ketone with a para primary aminophenol of the benzene series is surprisingly effective for preventing or retarding gum formation in unstable hydrocarbon mixtures, for instance, gasolines produced by cracking processes.

The gum inhibitor of my invention is a new compound produced by condensing methyl isobutyl ketone with para amino phenol. This product is called the para hydroxy anil of methyl isobutyl ketone, and has the following probable formula:

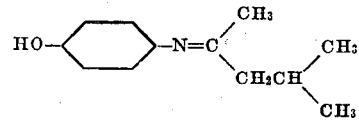

It is important that the aliphatic ketone residue of the gum inhibitor of my invention should contain at least 5 carbon atoms, since I have discovered the anils which contain 5 or more carbon atoms in the ketone residue are distinguished from the lower ketone-hydroxy anils by superior stability in hydrocarbon motor fuels during storage and by lower solubility in water. For example, I have found that if a hydrocarbon mixture which is stabilized by means of one of the lower ketone derivatives, e. g. para hydroxy acetone-anil, is treated with water the stability of the mixture to gum formation is seriously impaired, while a similar water treatment has no appreciable effect upon the stability to gum formation of a similar hydrocarbon mixture containing one of my higher ketone derivatives as a gum inhibitor.

Furthermore, it is preferable to employ ketone containing not more than 11 carbon atoms in preparing the condensation product of my invention, since the ketone derivatives containing more than 11 carbon atoms have a disproportionately large ketone residue, which may tend to obscure the effect of the active hydroxyl and imino groups in the molecule.

A preferred method of preparing the gum inhibitor of my invention, the para hydroxy anil of methyl isobutyl ketone, is to boil a mixture of p-aminophenol and methyl isobutyl ketone under reflux at atmospheric pressure for several hours. An excess of the ketone may be present as a solvent, or an inert solvent, e. g. toluene, may be added. Such added solvents must have sufficiently high boiling ranges to maintain the boiling temperature of the reactive mixture not substantially lower than about 100° C. and not substantially higher than about 140° C. during the course of the reaction. Water, which is eliminated as a result of the condensation, is removed from the zone of reaction, e. g. by separating it in a trap from the reflux condensate. Since, theoretically, one mol of water is eliminated per mol of condensation product formed, the quantity of water thus separated may be used as a convenient means for following the progress of the condensation. The condensation product may be crystallized from the reaction mixture by cooling, and separated by filtration in the form of a filter cake. The product may be purified by recrystallization from a suitable solvent, e. g. toluene.

In accordance with my invention, the condensation product hereinabove described is used as inhibitor to prevent or retard the formation of gum under normal storage conditions in hydrocarbon mixtures, particularly low-boiling distillates of the gasoline boiling range, which are normally intended for use as fuel for internal combustion engines. The aforesaid condensation product is preferably added to motor fuel in sufficient amount to yield a concentration of from about .001 to about .1% by weight. It may be added directly to the fuel or it may first be dissolved in a suitable common solvent, such as isobutanol, and the resulting solution added to the fuel.

The following example is illustrative of my invention:

Equal parts by weight of p-aminophenol, methyl isobutyl ketone, and toluene were mixed and heated in an apparatus provided with a reflux condenser and an automatic separator or trap for the purpose of continuously removing water from the reflux condensate. Reflux began when the temperature reached about 108° C. The heating was continued for about 6 hours, during which time the boiling temperature rose to approximately 135° C. About 95% of the amount of water which theoretically should be formed during the condensation was separated during this period from the reflux condensate. Heating was then discontinued and the liquid in the reaction vessel was allowed to cool to about 100° C. An additional ½ part by weight of toluene was added and the mixture was allowed to cool to 20° to 25° C. A grayish crystalline material was precipitated from the liquid. The material was separated by filtration as a filter cake which was washed with ½ part of toluene, and dried. The crude product which melted with decomposition at a temperature between 141° and 147° C. yielded by recrystallization from toluene, a white product which melted with decomposition from 146° to 148° C.

0.1 gram of this compound was dissolved in 100 cc. of isobutanol. 5 cc. of the resulting solution were added to 200 cc. of an unstable hydrocarbon mixture consisting of 25% by weight cyclohexene and 75% of a substantially saturated naphtha having a boiling range from 100° to 150° C. The stability, with reference to gum formation, of the treated hydrocarbon mixture and of the untreated mixture was determined by means of the well-known oxygen bomb test, which consists in heating a sample of the mixture to a temperature of 100° C. in a calorimetric bomb which has been filled at room temperature with oxygen at a gage pressure of 100 pounds per square inch, and noting the period which elapses before the pressure in the bomb begins to fall at a relatively rapid rate, i. e. when the pressure in the bomb has decreased 15 pounds per square inch below the maximum pressure. The length of this period, i. e. the induction period, is an approximate indication of the stability of the mixture to gum formation.

On subjecting the above-described treated hydrocarbon mixture to the oxygen bomb test, an induction period of 11½ hours was observed. After washing a portion of the treated hydrocarbon solution with water, its induction period was found to be 9½ hours. The induction period of the unstable hydrocarbon mixture without the inhibitor was 2½ hours.

The inhibiting power of the above-described product may be compared with the inhibiting power of gum inhibitors heretofore known by use of the formula $$I.P. = \frac{S-B}{B} \cdot \frac{1}{C}$$

wherein I. P. is the inhibiting power; S is the induction period of a sample of an unstable low-boiling hydrocarbon mixture which has been stabilized by the addition of a gum inhibitor; C is the concentration of the gum inhibitor in the hydrocarbon mixture expressed in percent by weight; and B is the induction period of the same unstable hydrocarbon mixture containing no gum inhibitor.

Upon applying the above formula to the results of the foregoing oxygen bomb test, the condensation product of methyl isobutyl ketone and p-aminophenol showed an inhibiting power of 1150. As contrasted with this p-benzylaminophenol, one of the best known of the inhibitors heretofore used, showed an inhibiting power of only 700.

Since certain changes may be made in the above-described practice of my invention without departing from the scope of the invention, it will be understood that all matter contained in the above description should be interpreted as illustrative and not in a limiting sense.

I claim:

1. A gum inhibitor for gasoline comprising the para hydroxy anil of methyl isobutyl ketone.

2. A petroleum product comprising a distillate of the gasoline boiling range containing from about .001 to about .1% by weight of the para hydroxy anil of methyl isobutyl ketone.

3. A method of inhibiting gum formation in gasoline produced by cracking processes comprising incorporating in said gasoline a solution of the para hydroxy anil of methyl isobutyl ketone in sufficient amount to yield a concentration of from about .001 to about .1% by weight of the anil in the gasoline.

4. The para hydroxy anil of methyl isobutyl ketone.

MELVILLE EHRLICH.